United States Patent
Kanai et al.

(10) Patent No.: US 7,076,020 B2
(45) Date of Patent: Jul. 11, 2006

(54) OXIDE PHOSPHOR AND RADIATION DETECTOR USING IT, AND X-RAY CT DEVICE

(75) Inventors: Tsuneyuki Kanai, Chiba (JP); Makoto Sato, Chiba (JP); Ichiro Miura, Chiba (JP); Hiromichi Yamada, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 282 days.

(21) Appl. No.: 10/451,247

(22) PCT Filed: Dec. 20, 2001

(86) PCT No.: PCT/JP01/11176

§ 371 (c)(1),
(2), (4) Date: Oct. 15, 2003

(87) PCT Pub. No.: WO02/50211

PCT Pub. Date: Jun. 27, 2002

(65) Prior Publication Data

US 2004/0066883 A1    Apr. 8, 2004

(30) Foreign Application Priority Data

Dec. 21, 2000  (JP)  ............................. 2000-389343

(51) Int. Cl.
*G21K 1/12*  (2006.01)

(52) U.S. Cl. .................................................... 378/19

(58) Field of Classification Search ......... 252/301.4 R; 378/19
See application file for complete search history.

(56) References Cited

U.S. PATENT DOCUMENTS

| 5,484,750 | A | * | 1/1996 | Greskovich et al. | .......... 501/86 |
| 5,998,925 | A | * | 12/1999 | Shimizu et al. | ............. 313/503 |
| 6,246,744 | B1 | * | 6/2001 | Duclos et al. | ................ 378/19 |
| 6,538,371 | B1 | * | 3/2003 | Duggal et al. | ............... 313/486 |

* cited by examiner

*Primary Examiner*—David Porta
*Assistant Examiner*—Djura Malevic
(74) *Attorney, Agent, or Firm*—Antonelli, Terry, Stout and Kraus, LLP.

(57) ABSTRACT

An oxide phosphor includes an oxide consisting of at least Gd, Ce, Al, Ga, and O, and has the crystal structure of a garnet structure, the atomic ratio (Gd+Ce)/(Al+Ga+Gd+Ce) of which is more than 0.375 and 0.44 or less, and the atomic ratio Ce/(Ce+Gd) of which is 0.0005 or more and 0.02 or less. This oxide phosphor reduces composition misalignment occurring during sintering, being a drawback of a phosphor having $(Gd_{1-x}Ce_x)_3Al_{5-y}Ga_yO_{12}$ composition, and has a property of extremely small afterglow and high luminescence efficiency. By using this oxide phosphor as a scintillator of a radiation detector having a light detector, the radiation detector with low afterglow and high output can be obtained. Further, by applying this radiation detector to an X-ray CT apparatus, a tomogram with high resolution and high quality can be obtained.

26 Claims, 3 Drawing Sheets

OXIDE PHOSPHOR AND RADIATION DETECTOR USING IT, AND X-RAY CT DEVICE

TECHNICAL FIELD

The present invention relates to a radiation detector for detecting X-rays, gamma rays, and the like; and, more particularly, the invention relates to an oxide phosphor, that is suitable for use in a radiation detector such as an X-ray CT apparatus and a positron camera, and to a radiation detector and an X-ray CT apparatus in which an oxide phosphor is used.

BACKGROUND OF THE INVENTION

A radiation detector for an X-ray CT apparatus there has conventionally used a xenon gas chamber, a combination of bismuth germanium oxide (BGO single crystal) and a photomultiplier tube, as well as combinations of a CsI:Tl single crystal or $CdWO_4$ single crystal and a photodiode. In recent years, a rare-earth phosphor having good radiation-to-light conversion efficiency has been developed, and a radiation detector using a combination of such a phosphor and a photodiode has already been put into practical use.

A rare-earth phosphor consists of a rare-earth element oxide or a rare-earth element oxysulfide as a base material, to which is added an activator that serves as a luminescent component. As a rare-earth element oxide phosphor, a phosphor including yttrium oxide and gadolinium oxide as a base material, and a phosphor represented by a formula $(Gd_{1-x}Ce_x)_3Al_{5-y}Ga_yO_{12}$ have been proposed in Japanese Patent Laid-open Publication JP-A-3-50991 and in International Patent Laid-open Publication WO99/33934 (PCT/JP98/05806), respectively.

Properties generally required of a scintillator material of the type used in a radiation detector include high luminescence efficiency, short afterglow, and high X-ray stopping power. There are phosphors having high luminescence efficiency among the above-mentioned phosphors, but the afterglow time thereof is relatively long. When the afterglow of the scintillator used in X-ray detectors of an X-ray CT apparatus is large, the acquired information becomes indistinct along the time-axis. Many conventional scintillator materials have a problem with large afterglow. However, the phosphor $(Gd_{1-x}Ce_x)_3Al_{5-y}Ga_yO_{12}$ ($0.0005 \leq x \leq 0.02$, $0<y<5$), mentioned in the International Patent Laid-open Publication WO99/33934, has excellent scintillator properties, including both high light emission output and short afterglow.

Although it has been confirmed that $(Gd_{1-x}Ce_x)_3Al_{5-y}Ga_yO_{12}$ material in powder form certainly has good scintillator properties, it has been also found that a new problem occurs when manufacturing a scintillator plate using this powder composition. That is, the luminescence efficiency and the afterglow greatly fluctuate when sintering the scintillator plate, and it is hard to obtain stable properties. Especially, it has been revealed that the afterglow properties are significantly deteriorated by sintering, and the thickness of the sintered body increases as well. A thick sintered body is indispensable for a low cost manufacturing technique, so that there has been a need for a technique for manufacturing a thick sintered body with low afterglow.

An object of the present invention is to provide a phosphor which has a thick plate or block shape that is suitable for mass production, while also having a high luminescence efficiency to X-rays, an extremely low afterglow, and good reproducibility of these properties, by solving the instability of the scintillator properties, which is a drawback of the phosphor of $(Gd_{1-x}Ce_x)_3Al_{5-y}Ga_yO_{12}$ composition.

Another object of the present invention is to obtain a radiation detector with large light emission output and low afterglow by using the above-described phosphor as a scintillator of a radiation detector having a light detector.

Still, another object of the present invention is to provide a tomogram having high resolution and high quality by applying the above-descibed radiation detector to an X-ray CT apparatus.

SUMMARY OF THE INVENTION

To achieve the above-described objects, three-component phosphors (sintered bodies) consisting of (Gd,Ce)—Al—Ga with various compositions were manufactured, and the afterglow thereof was measured. As a result, it was found that scintillator material having low afterglow with significantly greater stability can be obtained, regardless of the plate thickness of the sintered body or the shape and size of the sintered body, when the composition is in a predetermined non-stoichiometric region. Consequently, the invention has been based on this finding. That is, the present invention provides an oxide phosphor and a sintered body thereof, described below:

(1) an oxide consisting at least of Gd, Ce, Al, Ga, and O, the crystal structure of which is a garnet structure, wherein the atomic ratio (Gd+Ce)/(Al+Ga+Gd+Ce) is more than 0.375 and no more than 0.44, and the atomic ratio Ce/(Ce+Gd) is no less than 0.0005 and no more than 0.02.

(2) an oxide phosphor and a sintered body thereof according to paragraph (1), wherein the atomic ratio of Ga/(Al+Ga) is more than 0 and less than 1.0.

(3) an oxide phosphor and a sintered body thereof according to paragraphs (1) or (2), having a perovskite structure as an impurity phase.

(4) an oxide phosphor and a sintered body thereof according to paragraph (3), wherein the intensity of the main diffraction line of the perovskite structure in X-ray diffraction measurement is 50% or less of the intensity of the main diffraction line of the garnet structure.

Further, the present invention provides a radiation detector having a ceramics scintillator and a light detector for detecting light emission of the scintillator, the ceramics scintillator using an oxide phosphor according to the foregoing paragraphs (1) to (4).

Further, the present invention provides an X-ray CT apparatus having an X-ray source; an X-ray detector placed opposite to the X-ray source; a rotating circular plate supporting the X-ray source and the X-ray detector, which is driven to rotate around an object to be examined; and an image reconstructing means for image-reconstructing a tomogram of the object, based on the intensity of X-rays detected by the X-ray detector, wherein the above-described radiation detector is employed as the X-ray detector.

Hereinafter, the details of the phosphor according to the present invention will be described. The phosphor of this invention is an oxide phosphor including Gd, Al, and Ga as base elements and Ce as the luminescence component, similar to the phosphor $(Gd_{1-x}Ce_x)_3Al_{5-y}Ga_yO_{12}(Gd_{1-x}Ce_x)$ ($0.0005 \leq x \leq 0.02$, $0<y<5$) described in the international publication WO99/33934 of the international patent application by the inventors of the present invention. While the one mentioned in the international publication WO99/33934 is a phosphor having a stoichiometric composition, the one according to the present invention has a non-stoichiometric composition.

Incidentally, the description of constituent elements of the phosphor mentioned in the specification of the international publication WO99/33934 constitutes a part of this specification.

FIG. 3 is a composition diagram of a (Gd,Ce)–Al—Ga three-component system. In the drawing, the line designated by reference character S represents the phosphor of the formula $(Gd_{1-x}Ce_x)_3Al_{5-y}Ga_yO_{12}$, described in the international publication WO99/33934, and according to the notation system in this invention, it is described by the relations (Gd+Ce)/(Al+Ga+Gd+Ce)=3/8=0.375, 0.0005≦Ce/(Ce+Gd) ≦0.02, 0<Ga/(Al+Ga)<1.

The phosphor according to the invention is the one in the composition region K of a non-stoichiometric composition, shown by hatching in FIG. 3.

More specifically, the atomic ratio (Gd+Ce)/(Al+Ga+Gd+Ce) is more than 0.375 and no more than 0.44, and the atomic ratio of Ce/(Ce+Gd) is no less than 0.0005 and no more than 0.02.

If the atomic ratio (Gd+Ce)/(Al+Ga+Gd+Ce) is 0.375 or less, among the scintillator properties, the afterglow particularly increases by a hundredfold, and the light emission output decreases by 30% or more. On the other hand, if the atomic ratio (Gd+Ce)/(Al+Ga+Gd+Ce) is above 0.44, the damping factor of the afterglow 300 ms after stopping the excitation source is a stably low value, for example, about $4 \times 10^{-5}$. However, the $Gd(Ga,Al)O_3$-phase of the perovskite structure constituting a hetero phase is generated, comprising 50% or more of the host crystal of the garnet structure. Further, the light emission output is deteriorated by 40%.

If the ratio Ce/(Ce+Gd) is outside the above range, sufficient light emission cannot be obtained. The atomic ratio Ga/(Al+Ga) is preferably more than 0 and less than 1.0. If this atomic ratio is out of the above range, sufficient emission intensity cannot be obtained, even if Ce is doped.

The above-described change of the scintillator properties caused by variation of the atomic ratio (Gd+Ce)/(Al+Ga+Gd+Ce) can be understood from the following consideration of the crystal structure.

FIG. 4 shows a garnet structure having a theoretical stoichiometric composition represented by $(Gd_{1-x}Ce_x)_3Al_{5-y}Ga_yO_{12}$. The ion radii of Gd and Ce are 0.97 Å and 1.07 Å respectively, and those of Al and Ga are 0.51 Å and 0.62 Å, respectively. Now, consider the case of a non-stoichiometric composition, the composition of which is shifted from the stoichiometric composition (Gd,Ce):(Al,Ga)=3:5. When Gd components exceed the stoichiometric composition, the Gd ions cannot be substituted into the (Al,Ga), sites since the ion radius of the Gd ion is large. Thus, these extra Gd ions are present in the garnet structure host crystal, the hetero phase of which is the $GdAlO_3$ perovskite structure.

On the other hand, when the Gd component is less than that of the stoichiometric composition, that is, when the (Al,Ga) components exceed the stoichiometric composition range, Al or Ga ions having a small radius can be substituted into the Gd sites and take on the garnet structure.

From this consideration of the crystal structure, the property change of the light emission output and afterglow can be described as follows: When there is an excess of Gd component, a hetero phase (absorber) which does not emit light is generated in the host crystal along with an increase of the Gd components, and the light emission output is gently reduced. However, since the hetero phase $GdAlO_3$ is not involved with light emission, it hardly at all affects the afterglow properties. On the other hand, when there is less of the Gd component than in the stoichiometric composition, the crystal structure retains the garnet structure. However, the Al or Gs ion deforms the structure of the crystal energy band and generates energy levels which allow electron transition to a forbidden band, since the Al or Gs ions which substitute for Gd sites are impurity ions in the garnet structure. It appears that, as a consequence, the afterglow becomes large, and the light emission output is also deteriorated, since the efficiency of energy transmission from the host crystal to the main luminescence center $Ce^{3+}$ deteriorates.

In this manner, in a phosphor including Ce as a luminescence element and a host crystal having a garnet structure including at least Gd, Al, Ga, and O, the luminescence properties and afterglow properties are greatly deteriorated even when the composition is slightly changed to have less (Gd+Ce) than in the stoichiometric composition (Gd+Ce)/(Al+Ga+Gd+Ce)=0.375.

Theoretically, good scintillator properties should be obtained when the stoichiometric composition (Gd+Ce)/(Al+Ga+Gd+Ce)=0.375. However, in the process of manufacturing a scintillator plate, sintering easily causes the (Gd+Ce) components in this phosphor to decrease. Particularly, such influence becomes significant when a thick sintered body is employed. When a phosphor powder of the stoichiometric composition is employed, the phosphor properties of the sintered body are deteriorated. Therefore, in accordance with the present invention, the (Gd+Ce) component of the phosphor powder composition is made excessive by the amount with which good scintillator properties can be obtained, compensating for the composition misalignment effect by sintering. Thus, a phosphor element with low afterglow can be manufactured even when a thick sintered body is employed.

The crystal form of the phosphor, according to this invention, is not particularly limited, and either a single crystal or a poly crystal can be employed. However, the poly crystal is preferable in terms of ease of manufacture and uniformity of properties. The poly crystal can be obtained by 1) the process of synthesizing the powder which is to be a raw material of the scintillator, and then 2) the process of sintering the powder. To obtain an oxide of the desired garnet structure, a smaller crystal-grain diameter of the synthesized powder is preferable, 10 µm or less being desirable.

The methods of powder synthesis include 1) a method basically using a conventional oxide-mixing method, 2) a method using a liquid phase, such as a co-precipitation method and a sol-gel method, 3) a method based on an oxide-mixing method, in which the synthesized powder is finely divided by mechanical means, and the like.

When using a conventional oxide-mixing method, the following manufacturing processes are feasible. A predetermined amount of powder, including such constituent metallic material as $Gd_2O_3$, $Ce_2O_3$, $Ga_2O_3$ in powder form, is weighed, and the powder is mixed in wet process using a ball mill, an automatic mortar, or the like. This mixed powder is sintered in 1000° C.~1700° C. air or oxygen for several hours, thus resulting in the synthesized powder for a scintillator. If necessary, generation of a Gd—Ce—Al—Ga—O-system garnet structure can be improved by using, as a flux, a potassium compound, such as $K_2SO_4$, or a fluorine compound, such as $BaF_2$.

In the process using co-precipitation, synthesis can be performed as follows, for example: A predetermined amount of gadolinium nitrate, alumina nitrate, gallium nitrate, and cerium nitrate is weighed so as to make a compound nitrate water solution, and urea is made to coexist with nitrate ions, the urea concentration being fifteen times as much as the total metal-ion concentration. This water solution is heated to 70–100° C. to hydrolyze the urea, and a Gd—Al—Ga—O precursor is deposited.

The deposition is repeatedly cleaned so as to lower the concentration of negative ions, which are useless, in the deposition to less than 1000 ppm, and it is dried at about 120° C. and subject to temporary sintering at about 1200° C., whereby the scintillator powder is made. The drying temperature should be 90° C. or more for good evaporation of moisture, and the temporary-sintering temperature should be 900° C. or more, temperatures at which the garnet structure is generated. Heat treatment in which the crystal grains of the generated garnet structure are developed must be avoided.

The material used in the co-precipitation method is not limited to a nitrate, and a nitrate, sulfate, oxalate and the like of any kind of metal may be employed. Depending on the circumstances, several kinds of metallic salts may be mixed and used. Ammonium bicarbonate may also be used instead of urea.

The Gd—Ce—Al—Ga—O precursor can also be deposited by adding to the compound metallic solution 1) urea and ammonium lactate, 2) ammonium bicarbonate and ammonia water, 3) ammonium sulfate and ammonia water, or 4) oxygenated water, as a masking agent, and ammonium sulfate and ammonia water.

Finely dividing powder in mechanical manner is also a method suitable for obtaining the garnet structure by sintering. That is, as in the above-described oxide-mixing method, a predetermined amount of oxide of the metal which is to be a component of the composition is weighed and mixed by an automatic mortar for about thirty minutes. The mixed powder is subject to temporary sintering at around 1500° C., and it is mechanically grinded. A grinding method with high grinding energy, such as a ball mill, or preferably a planetary ball mill, should be employed. Thus, powder having a 0.01 to 0.5 μm grain diameter can be easily obtained.

Sintering of the thus-synthesized powder can be carried out using a hot pressing method, an HIP method, a pressureless sintering method, simultaneous use of the pressureless sintering method and the HIP method, and the like. In any case, the relative density of the sintered body should be 99.0% or more, and preferably 99.5% or more. The "relative density" is a percentage of the actual density, the theoretical density of the material being 100. If the relative density becomes low, the scattering of light increases and the light transmission is extremely deteriorated, whereby sufficient light output cannot be obtained. Therefore, the relative density should be within the above-described range.

When the hot pressing method is employed, the above-described synthesized powder is shaped with a mold with 500 kgf/cm$^2$ pressure, set into a hot-press mold, and sintered under about 500 kgf/cm$^2$ pressure in vacuum, air, or oxygen at a sintering temperature 1000° C.–1700° C. In this manner, a phosphor having 99.5% or more relative density can be easily obtained.

In the HIP method, the synthesized powder is put into a metallic capsule made from iron, W, Mo, or the like, vacuum sealed, and sintered at about 1400° C. under 2000 atm pressure.

In the pressureless sintering method, the synthesized powder is shaped with a mold under about 500 kgf/cm$^2$ pressure, and is then subject to cold isostatic pressing (CIP) with about 3000 kgf/cm$^2$ pressure. Then, it is sintered for several to several-ten hours at about 1400–1800° C. When the temperature is over 1800° C., the sample melts. When the temperature is under 1400° C., the sintering density becomes about 90% and sufficient sintering density cannot be obtained.

To obtain a sintered body with 99.5% or more relative density by the pressureless sintering method, 1) powder to which a sintering auxiliary agent is added, or 2) minute powder of a sub-micron size, is preferably employed as the synthesized powder. Also, since pores are closed by pressureless sintering when the relative density of the sintered body is about 93.0% or more, a phosphor having 99.5% or more relative density can be easily obtained by employing the capsule-free HIP method in which a metallic capsule is not needed.

In the phosphor obtained by the above-described method according to the present invention, the host crystal has a garnet structure, the material has its main luminescence spectrum peak at about 535 nm, and the damping factor of the afterglow 300 ms after stopping the excitation source is $1 \times 10^{-4}$ or less. This oxide phosphor has a high light emission output and an extremely small afterglow, whereby it is suitable for use as a radiation detector of X-rays and the like, particularly for a radiation detector for a X-ray CT apparatus and a positron camera.

As a light detector of the radiation detector according to the present invention, a PIN-type diode is employed. This photodiode has a high sensitivity, a fast response time, and a wavelength sensitivity through the visible ray area and the near infrared ray area, whereby the phosphor according to the present invention well matches the luminescence wavelength.

Further, in the X-ray CT apparatus according to the present invention, the above-described radiation detector is employed as an X-ray detector. By employing such an X-ray detector, X-rays can be detected with high detecting efficiency, whereby the sensitivity thereof is greatly improved in comparison with an X-ray CT apparatus using a conventional scintillator ($CdWO_4$, for example). Further, since the afterglow is extremely low, an image having a high image-quality and a high resolution can be obtained.

BEST MODE FOR CARRYING OUT THE INVENTION

An embodiment of an X-ray detector and an X-ray CT apparatus according to the present invention will be described with reference to the drawings.

Figure 1:
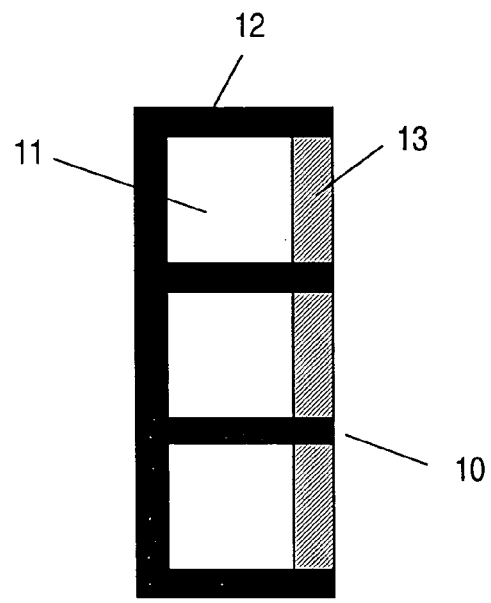
FIG. 1 is a schematic diagram showing a radiation detector (X-ray detector) using a scintillator according to the present invention.

FIG. 1 shows one example of an X-ray detector 10 using scintillators according to the invention. In the X-ray detector 10, a scintillator 11 is adhered to a photodiode 13, and it is covered with a covering member 12 for preventing light emitted by the scintillators from leaking to the outside. X-rays pass through the covering member, which is made of aluminum or another material that reflects light.

Incidentally, when applying the X-ray detector according to the invention to an X-ray CT apparatus, this X-ray detector is constructed such that several hundreds to several ten thousands of elements (detection channels) are arranged. FIG. 1 only shows three detection elements, which constitute one part of the detector.

In this X-ray detector, the scintillator 11 includes a phosphor according to the invention, which has an extremely small afterglow and a high light emission output in comparison with a conventional scintillator. Since the scintillator 11 has its luminescence peak near the 535 nm wavelength, which is relatively close to the sensitivity wavelength of Si photodiodes, X-rays absorbed by the scintillator 11 are photoelectrically converted by the photodiodes with high efficiency. Therefore, the X-ray detector according to the invention exhibits an excellent performance, including a high sensitivity and an extremely small afterglow.

Figure 2:
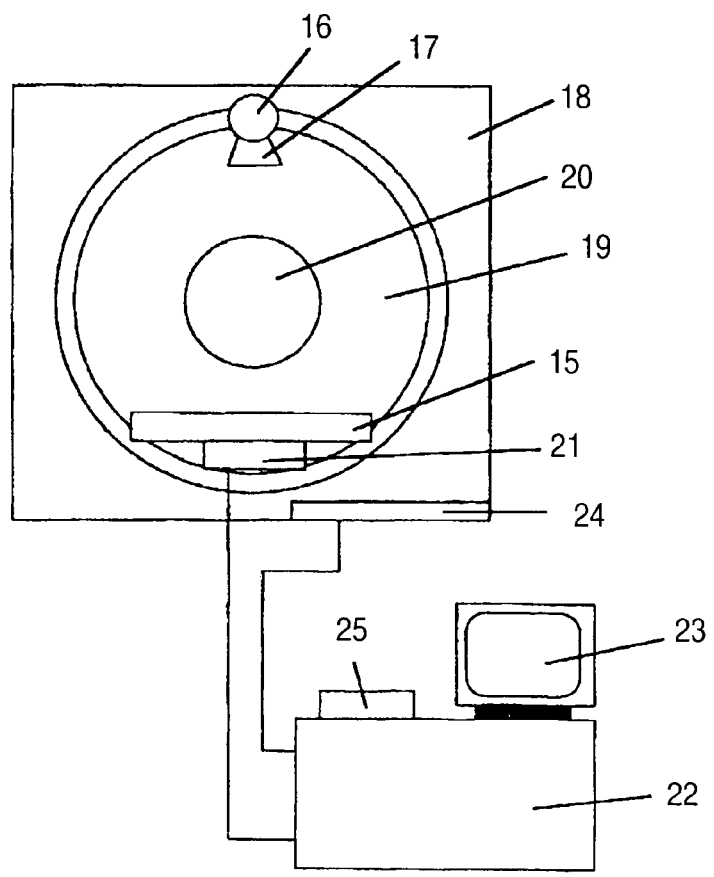
FIG. 2 is a schematic diagram showing the structure of an X-ray CT apparatus representing one embodiment according to the present invention.

FIG. 2 shows an outline of an X-ray CT apparatus according to the invention. This apparatus includes a gantry portion 18, an image reconstruction unit 22, and a monitor 23. The gantry portion 18 is provided with a rotating circular plate 19 having an opening 20 into which an object to be examined is inserted, an X-ray tube 16 mounted on this rotating circular plate, a collimator 17 which is mounted on the X-ray tube and controls the direction of X-ray irradiation, an X-ray detector 15 which is mounted on the rotating circular plate opposite to the X-ray tube, a detector circuit 21 for converting an X-ray dose detected by the X-ray detector 15 into a particular electric signal, and a scanning control circuit 24 for controlling rotation of the rotating circular plate and the width of X-ray irradiation.

The X-ray detector 15 is constructed such that a number of detection elements, each of which combines the scintillator 11 and the photodiode 13 according to the invention, as shown in FIG. 1, are lined up along the circumference of the rotating circular plate 19. This X-ray detector 15 detects the dose of X-rays, which are radiated and pass through the object.

The image reconstruction unit 22 includes an input device 25 for inputting the object's name, examination date, examination conditions, and the like, an image calculating circuit (not shown) for performing data-processing on measured data sent from the detector circuit 21, an image information addition unit (not shown) for adding information, such as the object's name, the examination date, and the examination conditions which were input by the input device 25, to CT images created by the image calculation circuit, and a display circuit (not shown) for adjusting the display gain of the CT images to which image information is added and output to the monitor 23.

In the X-ray CT apparatus having such a structure, X-rays are irradiated from the X-ray tube 16 to the object, which is laid on a bed (not shown) provided in the opening 20. The X-rays are provided with directivity by the collimator 17, and they are detected by the X-ray detector 15. By rotating the rotating circular plate 19 around the object, X-rays are detected while changing the radiating direction of the X-rays, tomograms are created by the image reconstruction unit 22, and they are displayed on the monitor 23.

Here, as the X-ray detector 15, a detector using the phosphor according to the invention, which has a low afterglow and a large emission intensity, is employed. Therefore, the image is not deteriorated due to afterglow, and images having a high image quality and a high resolution can be obtained.

EMBODIMENTS

Hereinafter, various embodiments of the present invention will be described in detail.

Embodiment 1

Figure 3:
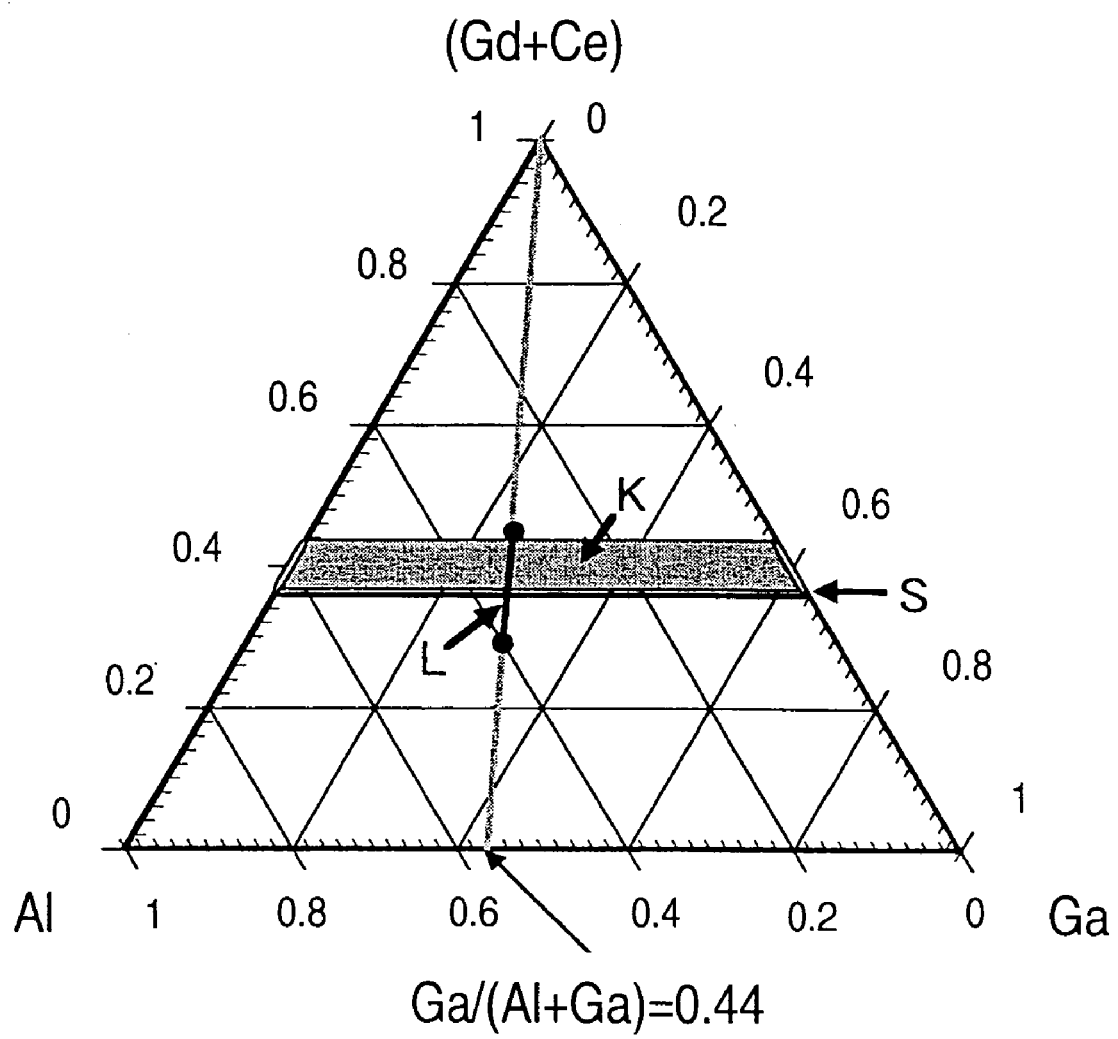
FIG. 3 is a diagram showing a (Gd+Ce)—Al—Ga three-component-system composition in an oxide phosphor according to the invention.
Figure 4:
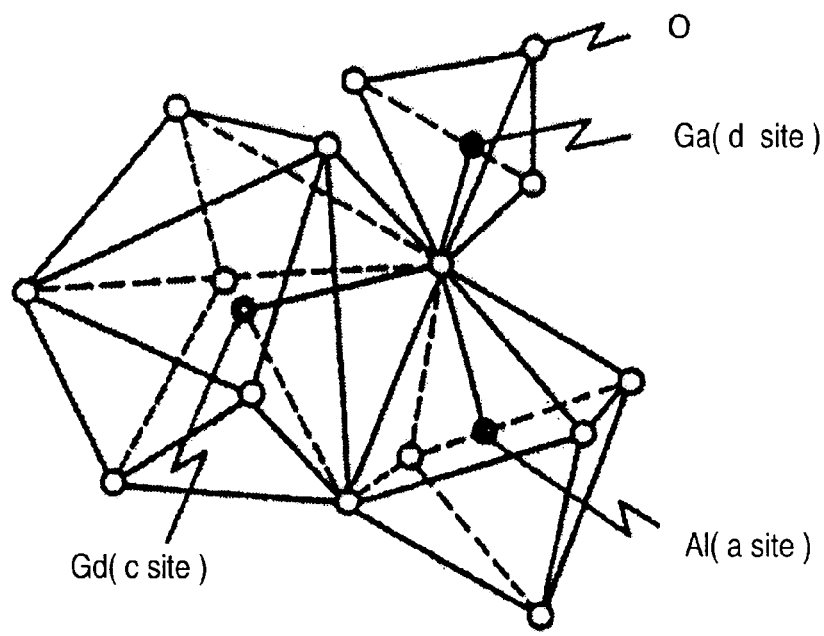
FIG. 4 is a diagram showing the garnet crystal structure of an oxide phosphor according to the present invention.

$Gd_2O_3$, $Ce_2(C_2O_4)_3$, $Al_2O_3$, and $Ga_2O_3$ were used as the material powder. The atomic ratios Ce/(Ce+Gd) and Ga/(Al+Ga) were fixed at 0.004 and 0.44, respectively. The material powder was weighed out so that the atomic ratio (Gd+Ce)/(Al+Ga+Gd+Ce) was 0.325 to 0.45, which corresponds to varying the composition along the thick line L in the composition diagram of FIG. 3.

Next, the measured material powder, alumina balls, and ion exchange water were put into a vessel made of polyethylene, and they were mixed by a ball mill for twelve hours. This mixed powder was put into an evaporating dish and dried, and the dried powder was sized by a nylon sieve. An alumina crucible was filled with the sized powder, and it was sintered in 1500° C. oxygen for four hours.

X-rays were irradiated from an X-ray source (120 kV, 0.5 mA) to the synthesized powder, and the afterglow and the luminescence intensity were measured. In this measurement, a detector using photodiodes is located 15 cm from the X-ray source, and the amount of light was measured. The afterglow is measured in terms of the damping factor 300 ms after stopping the X-rays, and the emission intensity is represented by a relative value.

The amount of generated hetero-phase is calculated from powder X-ray diffraction tests. The hetero-phase amount is defined as the ratio between the strength of the main diffraction line of the garnet crystal structure, which is the matrix, and the strength of the main diffraction line of the perovskite crystal structure, which is the hetero-phase.

Figure 5:
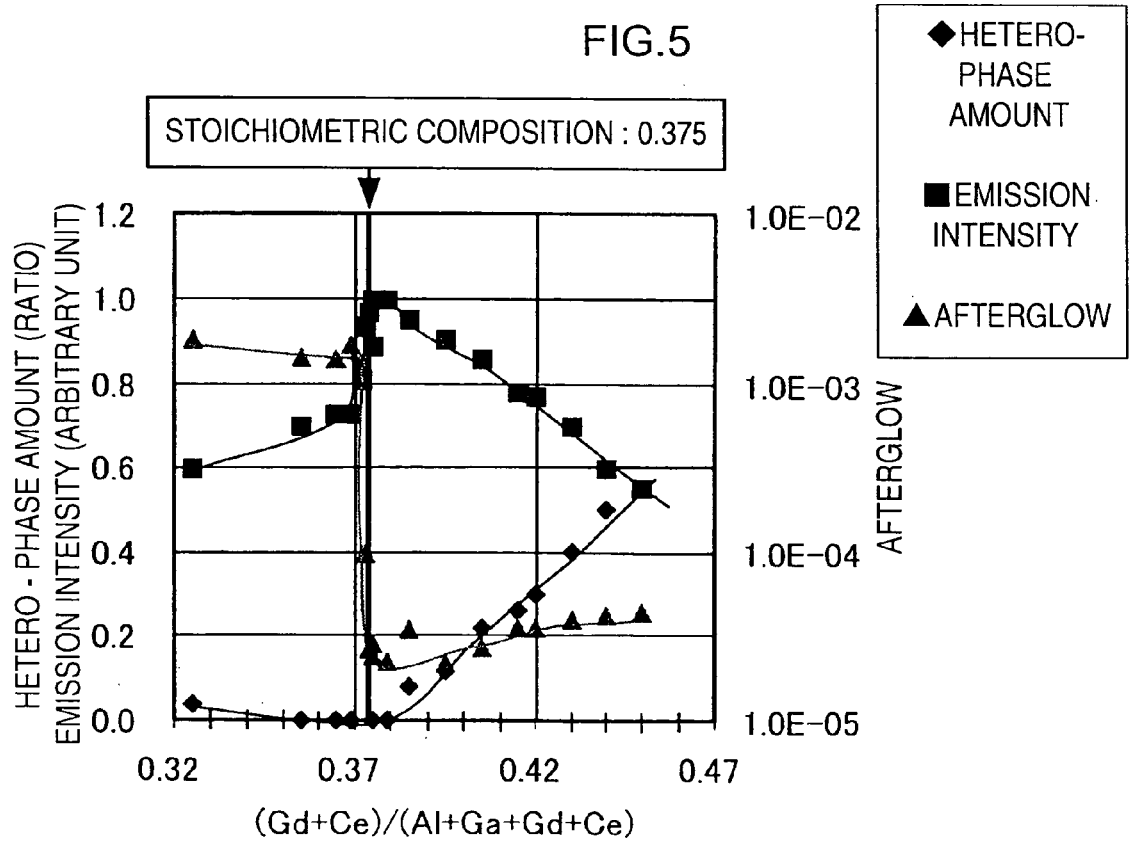
FIG. 5 is a graph showing the dependency of luminescence properties of the oxide phosphor upon composition according to the present invention.

FIG. 5 shows the result thereof. As is clear from the figure, the hetero-phase $GdAlO_3$ is generated in proportion to the amount of composition misalignment from the stoichiometric composition when the atomic ratio (Gd+Ce)/(Al+Ga+Gd+Ce) is larger than 0.375. The afterglow properties are hardly changed at all, being stable at about $4 \times 10^{-5}$, which is an extremely good value, as the atomic ratio is raised to 0.44. On the other hand, the luminescence properties are moderately deteriorated with an increase of the (Gd+Ce) component.

When the atomic ratio (Gd+Ce)/(Al+Ga+Gd+Ce) exceeds 0.44, the light emission output becomes about 60% of the stoichiometric composition or less, and the ratio of the perovskite phase, which is the hetero-phase present in the phosphor, is over 50%, indicating that the synthesized powder having such an atomic ratio is not suitable as a phosphor material. On the other hand, when the (Gd+Ce) component is less than that in the stoichiometric composition, the afterglow properties and the luminescence properties are greatly deteriorated in response to a slight composition misalignment. Even when the (Gd+Ce)/(Al+Ga+Gd+Ce) composition is reduced by only 0.003 in comparison with the stoichiometric composition, the value of the afterglow becomes about a hundredfold, and the light emission output is decreased by about 30%. Although the (Gd+Ce) component is decreased, the crystal structure remains as a garnet structure, and only when (Gd+Ce)/(Al+Ga+Gd+Ce) is 0.325 is the hetero-phase finally generated.

Embodiments 2 and 3

$Gd_2O_3$, $Ce_2(C_2O_4)_3$, $Al_2O_3$, and $Ga_2O_3$ were used as a material powder. The atomic ratios Ce/(Ce+Gd) and Ga/(Al+Ga) were fixed as 0.004 and 0.44, respectively. In this manner, a non-stoichiometric composition sample with (Gd+Ce)/(Al+Ga+Gd+Ce)=0.380 was manufactured. The material powder was measured out according to the composition in Chart 1.

Next, the measured material powder, alumina balls, and ion exchange water were put into a vessel made of polyethylene, and they were mixed by a ball mill for about 12 hours. The mixed powder was put into an evaporating dish and dried. The dried powder was sized by a nylon sieve. An alumina crucible was filled with the sized powder, and it was sintered in 1500° C. oxygen for about four hours. This synthesized powder was molded using a mold having 160 mm inner diameter with 500 $kgf/cm^2$ pressure, and a molded body was thus made. It was then set in a hot press die and hot-press sintered in a vacuum at 1475° C. for four hours under 500 $kgf/cm^2$ pressure, and sintered bodies having a 4.7 mm (Embodiment 2) thickness and having a 15 mm (Embodiment 3) thickness were thus obtained. The relative density of these sintered bodies were both 99.9% or more.

The sintered bodies that were obtained by the above-described method were sliced in the plate-thickness direction, one (Embodiment 2) or five (Embodiment 3) wafers having a 160 mm inner diameter were cut out, and the wafers were cut into a predetermined length and machined so as to have a 108 mm width. Thus, scintillator plates were manufactured in this way. These scintillator plates were annealed in oxygen for four hours, and the afterglow and the emission intensity were then measured. The result thereof is set forth in the chart 1.

Incidentally, the measurement of the afterglow and the emission intensity is performed for detectors made by combining the above-manufactured scintillator plates and photodiodes, and the detector is located 110 cm away from the X-ray source (120 kV, 150 mA). The afterglow is measured in terms of the damping factor 300 ms after stopping the X-rays, and the emission intensity is represented by a relative value with the emission intensity of $CdWO_4$ set as 1.

Comparative Examples 1 to 3

Sintered bodies respectively having a 4.7 mm width, a 10.0 mm width, and a 15.0 mm width were manufactured in the same manner as those of Embodiments 2 and 3, except that the atomic ratio (Gd+Ce)/(Al+Ga+Gd+Ce) of the starting material powder is 0.375. One, three and five wafers having a 160 mm inner diameter were cut out, respectively, from the above-obtained sintered bodies, and scintillator plates (Comparative Examples 1 to 3) were thus produced. These scintillator plates were also annealed in the same manner as Embodiments 2 and 3, and the afterglow and the emission intensity were measured. The result thereof is set forth in the chart 1.

Incidentally, in the interior of the respective scintillators, a great difference in the afterglow and emission intensity was not found between them in the plate-thickness direction and in the diameter direction.

CHART 1

| | Sintered Body Thickness (mm) | (Gd + Ce)/ (Gd + Ce + Al + Ga) | Gd | Ce | Al | Ga | Afterglow (300 ms) | Emission Intensity (versus $CsWO_4$) |
|---|---|---|---|---|---|---|---|---|
| Embodiment 2 | 4.7 | 0.380 | 3.03 | 0.01 | 2.78 | 2.18 | $1.2 \times 10^{-5}$ | 2.3 |
| Embodiment 3 | 15.0 | 0.380 | 3.03 | 0.01 | 2.78 | 2.18 | $1.4 \times 10^{-5}$ | 2.3 |
| Comp. Ex. 1 | 4.7 | 0.375 | 2.99 | 0.01 | 2.80 | 2.20 | $2.0 \times 10^{-5}$ | 2.2 |
| Comp. Ex. 2 | 10.0 | 0.375 | 2.99 | 0.01 | 2.80 | 2.20 | $3.0 \times 10^{-4}$ | 2.0 |
| Comp. Ex. 3 | 15.0 | 0.375 | 2.99 | 0.01 | 2.80 | 2.20 | $9.50 \times 10^{-4}$ | 1.7 |

In the samples of the stoichiometric composition (Comparative Examples 1 to 3), the afterglow was drastically increased as the plate thickness was increased. When the plate thickness was 15 mm, the value of the afterglow was increased by double digits. The emission intensity also deteriorated. On the other hand, in the samples of the non-stoichiometric composition (Embodiment 2 and 3), the afterglow was not increased and the emission intensity also was not deteriorated, even when the plate thickness was increased from 4.7 mm to 15 mm. Incidentally, the difference between 0.375 and 0.38 in the atomic ratios of (Gd+Ce)/(Al+Ga+Gd+Ce), being the measured out compositions, is not the result of a mere measuring error in manufacturing the material or an error occurring when the material powder absorbs moisture. This is because such errors are kept within 0.001 at the maximum.

Embodiments 4 to 13, and Comparative Examples 4 to 11

Sintered bodies were manufactured in the same manner as those in Embodiments 2 and 3, except that the atomic ratio of Gd, Ce, Al, and Ga was as shown in Chart 2. Though the atomic ratio Ga/(Al+Ga) is 0.44 in the Comparative Examples 1 to 3 and Embodiments 2 and 3, that in the Comparative Examples 4 to 7 and in Embodiments 4 to 8 is 0.70, and that in the Comparative Examples 8 to 11 and in Embodiments 9 to 13 is 0.30. The Ce concentration is fixed so that the atomic ratio Ce/(Ce+Gd) is 0.004, and the ratio (Gd+Ce)/(Al+Ga+Gd+Ce) is varied. The thickness of all sintered bodies is 15 mm.

The obtained sintered bodies were sliced in the plate-thickness direction. After cutting, the sintered bodies were machined into plates with a thickness of 1.8 mm, and they were annealed at 1300° C.

The hetero-phase amount in these scintillator plates was measured as the intensity ratio between the main peak of the diffraction line of the garnet structure and that of the hetero phase, which can be obtained by use of an X-ray diffraction apparatus. Detectors were formed by combining the obtained scintillator plates and photodiodes, they were located 110 cm from an X-ray source (120 kV, 150 mA), as in Embodiments 2 and 3, and the emission intensity and the afterglow were thus measured. The emission intensity was represented by a relative value, with the value of $CdWO_4$ set to be 1, and the afterglow was measured in terms of the damping factor 300 ms after stopping the X-rays. The result thereof is set forth in Chart 2 and Chart 3.

Embodiments 14 to 17 and Comparative Examples 12 and 13

Sintered bodies (15 mm thickness) of Embodiments 14 to 17 and of the Comparative Examples 12 and 13 were manufactured in the same manner as those in Embodiments 2 and 3, except that the atomic ratio (Ge+Ce)/(Al+Ga+Gd+Ce) was set to be 0.38, the atomic ratio Ce/(Ce+Gd) as the Ce concentration was set to be 0.004, and the atomic ratio Ga/(Al+Ga) was varied from 0.0 to 1.0.

These sintered bodies were sliced in the plate-thickness direction. After cutting, they were machined so as to make their thickness 1.8 mm. Scintillator plates were thus made, and they were annealed at 1300° C.

Detectors were formed by combining the obtained scintillator plates and photodiodes, they were located 110 cm from an X-ray source (120 kV, 150 mA), and the afterglow and the emission intensity were thus measured. The afterglow was measured in terms of the damping factor 300 ms after stopping X-rays, and the emission intensity is represented by a relative value with respect to the value 1 of CdWO4. The results thereof are set forth in Chart 4.

CHART 2

| | (Gd + Ce)/(Gd + Ce + Al + Ga) | Gd | Ce | Al | Ga | Hetero-phase amount (%) | Afterglow (300 ms) | Emission Intensity (versus $CdWO_4$) |
|---|---|---|---|---|---|---|---|---|
| Comp. Ex. 4 | 0.35 | 2.79 | 0.01 | 1.56 | 3.64 | 0 | $1.5 \times 10^{-3}$ | 1.3 |
| Comp. Ex. 5 | 0.37 | 2.95 | 0.01 | 1.51 | 3.53 | 0 | $1.5 \times 10^{-3}$ | 1.3 |
| Comp. Ex. 6 | 0.375 | 2.99 | 0.01 | 1.50 | 3.50 | 0 | $1.9 \times 10^{-4}$ | 1.8 |
| Embodiment 4 | 0.376 | 3.00 | 0.01 | 1.50 | 3.49 | 0 | $1.0 \times 10^{-5}$ | 1.9 |
| Embodiment 5 | 0.378 | 3.01 | 0.01 | 1.49 | 3.48 | 0 | $1.0 \times 10^{-5}$ | 1.9 |
| Embodiment 6 | 0.39 | 3.11 | 0.01 | 1.46 | 3.42 | 9 | $1.0 \times 10^{-5}$ | 1.8 |
| Embodiment 7 | 0.41 | 3.27 | 0.01 | 1.42 | 3.30 | 24 | $1.5 \times 10^{-5}$ | 1.6 |
| Embodiment 8 | 0.44 | 3.51 | 0.01 | 1.34 | 3.14 | 39 | $2.5 \times 10^{-5}$ | 1.5 |
| Comp. Ex. 7 | 0.46 | 3.67 | 0.01 | 1.30 | 3.02 | 58 | $3.5 \times 10^{-5}$ | 1.2 |

CHART 3

| | (Gd + Ce)/(Gd + Ce + Al + Ga) | Gd | Ce | Al | Ga | Hetero-Phase Amount | Afterglow (300 ms) | Emission Intensity (versus $CdWO_4$) |
|---|---|---|---|---|---|---|---|---|
| Comp. Ex. 8 | 0.35 | 2.79 | 0.01 | 3.64 | 1.56 | 0 | $1.5 \times 10^{-3}$ | 1.1 |
| Comp. Ex. 9 | 0.37 | 2.95 | 0.01 | 3.53 | 1.51 | 0 | $1.5 \times 10^{-3}$ | 1.2 |
| Comp. Ex. 10 | 0.375 | 2.99 | 0.01 | 3.50 | 1.50 | 0 | $9.8 \times 10^{-5}$ | 1.6 |
| Embodiment 9 | 0.376 | 3.00 | 0.01 | 3.49 | 1.50 | 0 | $1.0 \times 10^{-5}$ | 1.7 |
| Embodiment 10 | 0.378 | 3.01 | 0.01 | 3.48 | 1.49 | 0 | $1.0 \times 10^{-5}$ | 1.7 |
| Embodiment 11 | 0.39 | 3.11 | 0.01 | 3.42 | 1.46 | 8 | $1.0 \times 10^{-5}$ | 1.6 |
| Embodiment 12 | 0.41 | 3.27 | 0.01 | 3.30 | 1.42 | 29 | $2.0 \times 10^{-5}$ | 1.4 |
| Embodiment 13 | 0.44 | 3.51 | 0.01 | 3.14 | 1.34 | 40 | $3.5 \times 10^{-5}$ | 1.3 |
| Comp. Ex. 11 | 0.46 | 3.67 | 0.01 | 3.02 | 1.30 | 58 | $3.8 \times 10^{-5}$ | 1.1 |

Even when the atomic ratio Ga/(Al+Ga) is 0.70 or 0.30, the hetero-phase amount is small and the emission intensity is relatively large as long as the atomic ratio (Gd+Ce)/(Al+Ga+Gd+Ce) is 0.375 or less (Comparative Examples 4 to 6, 8 to 10). However, since the thus obtained material had a damping factor of $10^{-3}$ to $10^{-4}$ of the afterglow after 300 ms, it was shown that the sintered body used therein became large and was not suitable as a scintillator material. When the atomic ratio (Gd+Ce)/(Al+Ga+Gd+Ce) was over 0.44 (Comparative Example 7 and 11), the hetero-phase amount was over 50%, and the emission intensity also was lowered.

On the other hand, the scintillators according to Embodiments 4 to 13 of the present invention have an extremely short afterglow and a high emission intensity, whereby it is understood that they have excellent scintillator properties.

CHART 4

| | (Gd + Ce)/(Gd + Ce + Al + Ga) | Ga/(Al + Ga) | Gd | Ce | Al | Ga | Afterglow (300 ms) | Emission Intensity (versus $CdWO_4$) |
|---|---|---|---|---|---|---|---|---|
| Comp. Ex. 12 | 0.38 | 0.00 | 3.03 | 0.01 | 4.96 | 0.00 | — | 0.0 |
| Embodiment 14 | 0.38 | 0.05 | 3.03 | 0.01 | 4.71 | 0.25 | $2.0 \times 10^{-5}$ | 1.2 |
| Embodiment 15 | 0.38 | 0.30 | 3.03 | 0.01 | 3.47 | 1.49 | $1.5 \times 10^{-5}$ | 2.1 |

CHART 4-continued

|  | (Gd + Ce)/ (Gd + Ce + Al + Ga) | Ga/ (Al + Ga) | Gd | Ce | Al | Ga | Afterglow (300 ms) | Emission Intensity (versus CdWO$_4$) |
|---|---|---|---|---|---|---|---|---|
| Embodiment 16 | 0.38 | 0.60 | 3.03 | 0.01 | 1.98 | 2.98 | $2.0 \times 10^{-5}$ | 2.0 |
| Embodiment 17 | 0.38 | 0.90 | 3.03 | 0.01 | 0.50 | 4.46 | $1.5 \times 10^{-5}$ | 1.3 |
| Comp. Ex. 13 | 0.38 | 1.00 | 3.03 | 0.01 | 0.00 | 4.96 | — | 0.0 |

From the chart, it is seen that, although the scintillators of Embodiments 14 to 17 have excellent afterglow and emission intensity properties, the emission intensity of the scintillators whose atomic ratio Ga/(Al+Ga) is 0 or 1.0 (Comparative Example 12 and Comparative Example 13), is much lower, and the sintered bodies thereof are not suitable for use as a scintillator.

Embodiments 18 to 21 and Comparative Examples 14 and 15

The scintillators of Embodiments 14 and 15 were manufactured in the same manner as those of Embodiments 2 and 3, except that the atomic ratio Ce/(Ce+Gd) is varied from 0.002 to 0.04. Incidentally, the atomic ratios (Gd+Ce)/(Al+Ga+Gd+Ce) and Ga/(Al+Ga) are fixed, respectively, to 0.38 and 0.44. The thickness of the sintered bodies is 15 mm. The result thereof is shown in Chart 5.

CHART 5

|  | (Gd + Ce)/ (Gd + Ce + Al + Ga) | Ce/ (Ce + Gd) | Gd | Ce | Al | Ga | Afterglow (300 ms) | Emission Intensity (versus CdWO$_4$) |
|---|---|---|---|---|---|---|---|---|
| Comp. Ex. 14 | 0.38 | 0.0002 | 3.04 | 0.0006 | 2.78 | 2.18 | $3.5 \times 10^{-4}$ | 0.8 |
| Embodiment 18 | 0.38 | 0.0005 | 3.04 | 0.0015 | 2.78 | 2.18 | $4.8 \times 10^{-5}$ | 1.6 |
| Embodiment 19 | 0.38 | 0.001 | 3.04 | 0.0030 | 2.78 | 2.18 | $1.5 \times 10^{-5}$ | 2.1 |
| Embodiment 20 | 0.38 | 0.005 | 3.02 | 0.0152 | 2.78 | 2.18 | $1.0 \times 10^{-5}$ | 2.0 |
| Embodiment 21 | 0.38 | 0.02 | 2.98 | 0.0608 | 2.78 | 2.18 | $3.0 \times 10^{-5}$ | 1.5 |
| Comp. Ex. 15 | 0.38 | 0.04 | 2.92 | 0.1216 | 2.78 | 2.18 | $2.5 \times 10^{-5}$ | 0.5 |

From the chart, it is seen that the scintillators of Embodiments 18 to 21 have excellent properties of afterglow and emission intensity, and the scintillators of the Comparative Examples 14 and 15, where the atomic ratio Ce/(Ce+Gd) is respectively less than 0.0005 and more than 0.02, are not suitable as the required scintillator because the emission intensities thereof are extremely low.

According to the present invention, a phosphor having an extremely low afterglow and a high luminescence efficiency can be provided by reducing the composition misalignment occurring during sintering, which is a drawback of a phosphor of $(Gd_{1-x}Ce_x)_3Al_{5-y}Ga_yO_{12}$ composition. Further, by using this phosphor as a scintillator for a radiation detector having a light detector, a radiation detector having a low afterglow and a high output can be obtained. By applying this radiation detector to an X-ray CT apparatus, a tomogram having a high resolution and a high quality can be obtained.

The invention claimed is:

1. An oxide phosphor having the oxide consisting of at least Gd, Ce, Al, Ga, and O, wherein a crystal structure of said oxide is a garnet structure, the atomic ratio (Gd+Ce)/(Al+Ga+Gd+Ce) is more than 0.375 and 0.44 or less, and the atomic ratio Ce/(Ce+Gd) is no less than 0.0005 and no more than 0.02.

2. An oxide phosphor according to claim 1, wherein the atomic ratio Ga/(Al+Ga) is more than 0 and less than 1.0.

3. An oxide phosphor according to claim 1, further including an impurity phase of a perovskite structure.

4. An oxide phosphor according to claim 3, wherein the intensity of a main diffraction line of the perovskite structure in an X-ray diffraction measurement is 50% or less with respect to the intensity of the main diffraction line of the garnet structure.

5. An oxide phosphor according to claim 1, wherein oxide powder is synthesized by at least one of the following methods: an oxide-mixing method, a coprecipitation method, and a mechanically grinding method using material powder.

6. An oxide phosphor according to claim 5, wherein the diameters of crystal grain of the oxide-synthesized powder are 1 μm or less.

7. An oxide phosphor according to claim 5, wherein said oxide-synthesized powder is sintered by at least one of the following methods: a hot-press method, an HIP method, a pressureless sintering method, and simultaneous use of a pressureless sintering method and an HIP method.

8. An oxide phosphor according to claim 7, wherein the relative density of the sintered body of the oxide-synthesized powder is 99.0% or more.

9. A scintillator including a sintered body of the oxide phosphor according to claim 1.

10. A radiation detector in an X-ray detector including a ceramics scintillator and a light detector for detecting light emission of said scintillator, wherein the scintillator according to claim 9 is employed as said ceramics scintillator.

11. An X-ray CT apparatus comprising:
an X-ray source;
an X-ray detector located opposite to said X-ray source;
a rotating disk holding said X-ray source and said X-ray detector, which is driven to rotate around an object to be examined; and an image reconstruction means for image-reconstructing a tomogram of said object on the basis of intensity of X-rays detected by said X-ray detector, wherein a radiation detector according to claim 10 is employed as said X-ray detector.

12. An oxide phosphor having the oxide consisting essentially of Gd, Ce, Al, Ga, and O, wherein a crystal structure of said oxide is a garnet structure, the atomic ratio (Gd+Ce)/(Al+Ga+Gd+Ce) is more than 0.375 and 0.44 or less, and the atomic ratio Ce/(Ce+Gd) is no less than 0.0005 and no more than 0.02.

13. An oxide phosphor according to claim 12, wherein the atomic ratio Ga/(Al+Ga) is more than 0 and less than 1.0.

14. An oxide phosphor according to claim 12, further including an impurity phase of a perovskite structure.

15. An oxide phosphor according to claim 14, wherein the intensity of a main diffraction line of the perovskite structure in an X-ray diffraction measurement is 50% or less with respect to the intensity of the main diffraction line of the garnet structure.

16. An oxide phosphor according to claim 12, wherein oxide powder is synthesized by at least one of the following methods: an oxide-mixing method, a coprecipitation method, and a mechanically grinding method using material powder.

17. An oxide phosphor according to claim 16, wherein the diameters of crystal grain of the oxide-synthesized powder are 1 µm or less.

18. An oxide phosphor according to claim 16, wherein said oxide-synthesized powder is sintered by at least one of the following methods: a hot-press method, an HIP method, a pressureless sintering method, and simultaneous use of a pressureless sintering method and an HIP method.

19. An oxide phosphor according to claim 18, wherein the relative density of the sintered body of the oxide-synthesized powder is 99.0% or more.

20. A scintillator including a sintered body of the oxide phosphor according to claim 12.

21. A radiation detector in an X-ray detector including a ceramics scintillator and a light detector for detecting light emission of said scintillator, wherein the scintillator according to claim 20 is employed as said ceramics scintillator.

22. An X-ray CT apparatus comprising:

an X-ray source;

an X-ray detector located opposite to said X-ray source;

a rotating disk holding said X-ray source and said X-ray detector, which is driven to rotate around an object to be examined; and an image reconstruction means for image-reconstructing a tomogram of said object on the basis of intensity of X-rays detected by said X-ray detector, wherein a radiation detector according to claim 21 is employed as said X-ray detector.

23. An oxide phosphor according to claim 12, wherein the oxide consists of Gd, Ce, Al, Ga and O.

24. A scintillator including a sintered body of the oxide phosphor according to claim 23.

25. A radiation detector in an X-ray detector including a ceramics scintillator and a light detector for detecting light emission of said scintillator, wherein the scintillator according to claim 24 is employed as said ceramics scintillator.

26. An X-ray CT apparatus comprising:

an X-ray source;

an X-ray detector located opposite to said X-ray source;

a rotating disk holding said X-ray source and said X-ray detector, which is driven to rotate around an object to be examined; and an image reconstruction means for image-reconstructing a tomogram of said object on the basis of intensity of X-rays detected by said X-ray detector, wherein a radiation detector according to claim 25 is employed as said X-ray detector.

* * * * *